United States Patent [19]
Hartley et al.

[11] Patent Number: 6,109,114
[45] Date of Patent: Aug. 29, 2000

[54] CAGING, CALIBRATION, CHARACTERIZATION AND COMPENSATION OF MICROSTRUCTURAL TRANSDUCERS

[75] Inventors: Frank T. Hartley, Arcadia; James H. Wise, Glendora, both of Calif.

[73] Assignee: California Institute of Technology, Pasadena, Calif.

[21] Appl. No.: 08/535,317

[22] Filed: Sep. 27, 1995

Related U.S. Application Data

[63] Continuation of application No. 08/106,448, Aug. 16, 1993, abandoned.

[51] Int. Cl.⁷ .................................................. G01P 15/125
[52] U.S. Cl. .................................. 73/774; 310/311; 338/2
[58] Field of Search ................................ 73/774, 514.01, 73/514.16; 310/311; 338/2

[56] References Cited

U.S. PATENT DOCUMENTS

| | | | |
|---|---|---|---|
| 3,737,684 | 6/1973 | Kuno et al. | 307/308 |
| 4,459,759 | 7/1984 | Hulsing, II | 33/304 |
| 4,872,342 | 10/1989 | Hanson et al. | 73/517 R |
| 4,930,043 | 5/1990 | Wiegand | 361/283 |
| 4,932,261 | 6/1990 | Henrion | 73/517 B |
| 5,134,881 | 8/1992 | Henrion et al. | 73/517 R |
| 5,211,051 | 5/1993 | Kaiser et al. | 73/1 D |
| 5,241,861 | 9/1993 | Hulsing, II | 73/505 |

*Primary Examiner*—Eric S. McCall
*Attorney, Agent, or Firm*—Michaelson & Wallace

[57] ABSTRACT

The invention is embodied in a microstructural transducer including a microstructural platform, a movable microstructural member, a microstructural linkage elastically coupling the movable microstructural member to the microstructural platform, measuring apparatus for sensing displacement of the movable microstructural member relative to the platform and control apparatus for inducing at least one field near the movable member in accordance with a predetermined stimulus. The predetermined stimulus may be selected to perform any one of several functions, including caging, calibration, characterization and compensation.

17 Claims, 1 Drawing Sheet

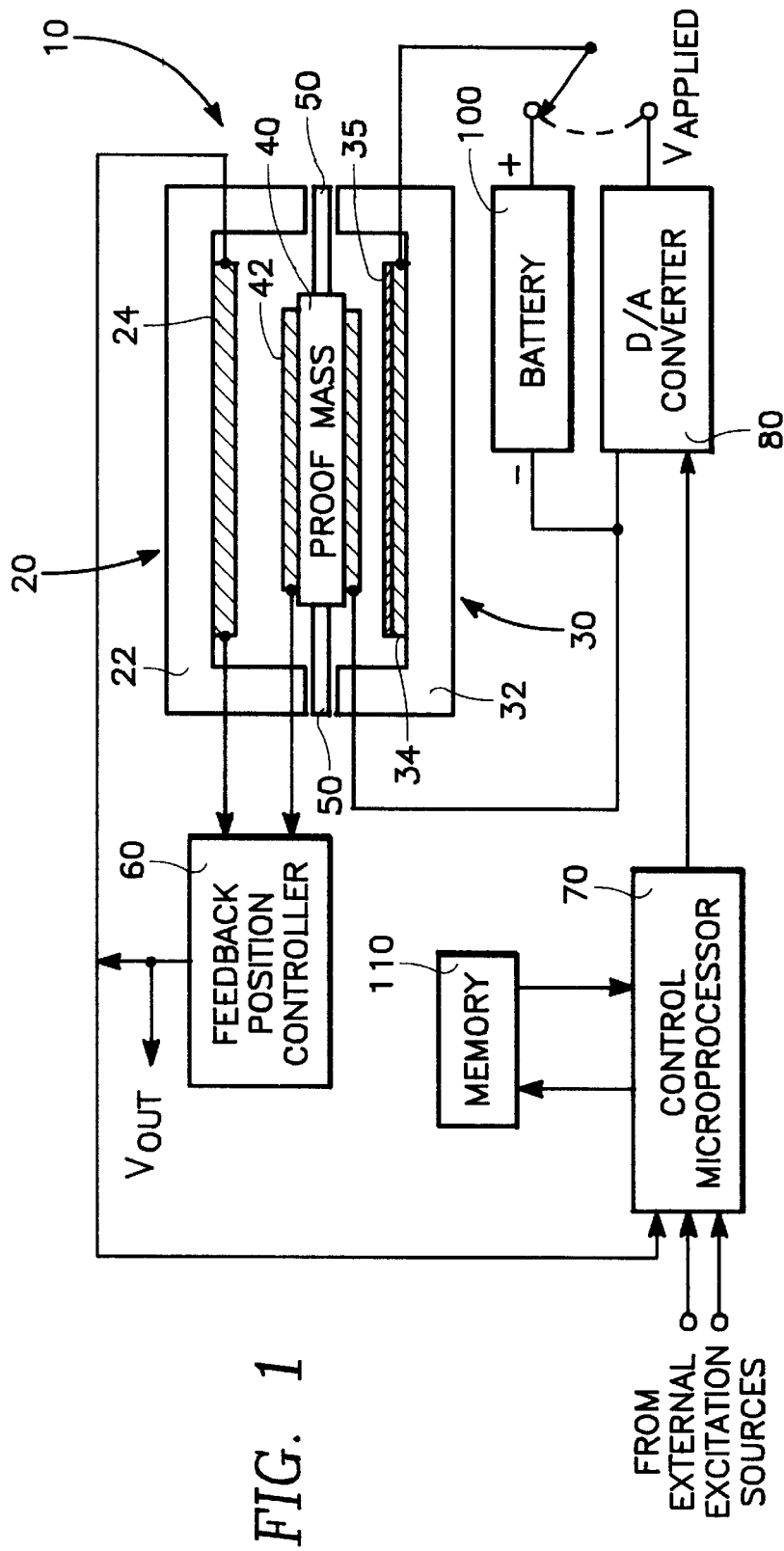

CAGING, CALIBRATION, CHARACTERIZATION AND COMPENSATION OF MICROSTRUCTURAL TRANSDUCERS

This is a continuation of application Ser. No. 08/106,448, filed Aug. 16, 1993 now abandoned.

ORIGIN OF THE INVENTION

The U. S. Government has certain rights in this invention pursuant to Grant No. F4962092-J-0400 awarded by the United States Air Force.

BACKGROUND OF THE INVENTION

1. Technical Field

The invention is related to microstructural devices such as micro-machined silicon transducers of the type employed as accelerometers, seismometers, geophones, magnetometers or pressure gauges and the like.

2. Background Art

Microstructural devices such as micro-machined silicon structures are fabricated using photolithography and processing techniques such as RF plasma etching and the like to form structures having micron or sub-micron feature sizes. Such structures provide extremely sensitive transducers. For example, a micro-machined silicon accelerometer consists of a known proof mass of micro-machined silicon supported on elastically deformable springs of micro-machined silicon and electrostatic platens consisting of thin metal patterns formed on micro-machined silicon surfaces. Measuring acceleration consists of measuring displacement of the proof mass, or the voltage required to maintain the proof mass at a predetermined null position, relative to one of the platens. This may be accomplished in a variety of ways, including capacitive measurements, electron tunneling or optical measurements, as but three of other possible examples.

There are various problems associated with such devices. One example is that the moving parts (such as micro-machined proof mass and spring structures in a sensor for measuring extremely small accelerations in the micro-G and sub-micro-G ranges) are extremely fragile. Forces generated by even the most careful handling during shipping or set-up will destroy the device if steps are not taken to counter these forces.

Another problem is that the calibration of such devices is difficult, particularly on-site calibrations during use. A related problem is that the characteristics or responsiveness of such a device is prone to drift over time or temperature, requiring frequent calibration during use to maintain the extremely fine accuracy of such a device.

An additional problem is that characterizing a micro-machined transducer is difficult because the device must be moved or accelerated while its response is being recorded or observed. For example, it may be desired to measure the frequency response of a micro-machined accelerometer. The indirect coupling between the physical stimulation of the device and its response renders such characterizations somewhat unreliable in many cases. Moreover, such characterizations are often carried out at a convenient location under one set of ambient conditions, such as, for example, the sensitive axis oriented normal to a one-g gravitational field. Unfortunately, the effects of the force normal to the sensitive axis are usually unknown. Such characterizations are assumed to be invariant for other ambient conditions (e.g., a zero-g gravitational field). Such assumptions are dictated by the inconvenience or impossibility of re-characterizing the transducer at a remote location where the other ambient conditions exist.

A further problem is that a micro-machined transducer has such a fine sensitivity that it is highly vulnerable to external or ambient disturbances or forces which tend to mask any smaller parameter whose measurement is sought.

SUMMARY OF THE DISCLOSURE

The invention is a microstructural transducer having a movable member whose displacement from an equilibrium position is monitored, and one or more control apparatuses for generating a field inside the microstructural transducer to impose desired force(s) on the movable member. Use of electrostatic and magnetic forces in the control apparatuses of such a microstructural transducer is made practical by the small dimensions of the transducer. These control apparatuses allow in-situ calibration, characterization and self-test, as well as static and dynamic compensation.

In one embodiment of the invention, the movable member is at one electric potential and the control apparatus is a first conductive platen to which a voltage is applied to produce an electric field. In one implementation of this embodiment, the displacement of the movable member is monitored by measuring the capacitance between the movable member and a second conductive platen on an opposite side of the movable member from the first conductive platen. In another implementation, the displacement of the movable member is monitored by measuring tunneling electron current flow in a conductive tip on the platen using well-known electron tunneling techniques.

Preferably, a feedback control loop controls the voltage applied to the second platen so as to hold the movable member at a particular displacement from the second platen. For example, in the case of an accelerometer, the device is oriented so that the acceleration to be measured tends to draw the movable member (a proof mass) away from the second platen, and the feedback loop senses the voltage required to oppose the acceleration so as to hold the proof mass at the equilibrium position, thus providing a measurement of the acceleration. The first platen applies a desired force on the proof mass opposing the equilibrating force applied by the second platen.

In another embodiment of the invention, the first and second electrostatic platens are replaced by a single electromagnet, and the movable member itself has a permanent magnetization. Sensing the displacement of the movable member may be accomplished by other than electron tunneling or capacitive sensing. For example, optical displacement sensing may be employed. The single magnet can exercise both attractive and repulse forces, depending upon the direction of current flow therethrough. Both the equilibrating function of the feedback loop and the desired forcing function of the control apparatus can be realized through the same magnet, if desired.

Caging

In order to prevent destruction of the device during shipping or handling, the desired force is a caging force which is sufficient to hold the movable member in a stationary position even under large external accelerations, to prevent injury thereto, and is applied constantly. Thus, as a caging device, the invention in the first embodiment thereof preferably includes a battery backup circuit for continuously generating the required voltage applied to the second platen during shipping, handling and even storage. Due to the extremely small size of the proof mass, a very small battery voltage, and virtually no current, is more than sufficient to hold the proof mass stationary. The advantage is that caging by any other means (such as mechanical devices inside the device) is impractical.

Calibrating

The invention is also useful for calibrating a micro-machined transducer. Specifically, the desired force may arise from an applied voltage on the first platen (or an applied current on the magnet, in the magnetic embodiment) previously correlated to a predetermined force on the movable member. By observing the response of the feedback controller to the applied voltage, the entire device may be calibrated. In fact, a large range of applied voltages corresponding to range of applied forces may be applied in succession to internally calibrate the micromachined transducer. The advantage is that the device is readily calibrated or re-calibrated at remote locations instantly and with great precision without any external calibration equipment of the type typically required. Thus, each new calibration accounts for any drift in responsiveness due to temperature changes, aging or other changes in ambient conditions (such as gravity).

Characterization

In order to characterize various parameters (such as frequency response) of a micro-machined transducer, the desired force applied by the control apparatus is a test stimulus signal (such as a static voltage, sine wave voltage or random wave voltage applied to the first platen in the electrostatic embodiment of the invention). Characterization is performed by observing the displacement of the moveable member (or the output of the feedback loop in the preferred embodiment) while simultaneously applying the test stimulus signal. An advantage is that many stimuli may be applied in rapid succession while monitoring the feedback loop output, for nearly instantaneous device characterization across a wide range of parameters. This range of parameters may include, for example, frequency response, phase response, linearity, hysteresis and the like.

Static and Dynamic Compensation

In order to compensate for various external excitations which would otherwise distort or swamp a desired measurement, the desired force may be the complement or inverse of the external excitation.

As one example, it may be desired to buck out a large ambient pressure so that only small pressure differentials are measured by the micro-machined transducer. Accordingly, the desired force is one which is equal and opposite to the force exerted on the movable member by the ambient pressure. This type of compensation requires the desired force to be fairly constant over time, and is therefore a type of static compensation.

As another example, three micro-machined accelerometers may be integrated in an inertial sensor, each accelerometer being aligned, to within a manufacturing error, along a respective one of three orthogonal axes. To the extent that manufacturing errors of each angle relative to the design axis and the rotation direction around the design axis of each accelerometer are tolerated to save manufacturing cost, the resulting cross-coupling between measurements otherwise deemed to be orthogonal is measured precisely after assembly of the inertial measurement device. During calibration and operation, the vector forces are measured using two known orthogonal forces to determine the proper correction for the third individual sensor. The same process is repeated to determine the correction for each of the sensors in a triaxial configuration. These correction factors are then applied to the calibrated sensitivity and the measured data to minimize the cross axis error.

BRIEF DESCRIPTION OF THE DRAWINGS

FIG. 1 is a simplified schematic diagram of apparatus embodying one version of the invention.

FIGS. 2 and 3 are graphs illustrating a type of data employed in carrying out one aspect of the invention.

DETAILED DESCRIPTION OF THE PREFERRED EMBODIMENTS

Referring now to FIG. 1, a micro-machined transducer includes a top platen 20 consisting of a micro-machined cover 22 and a conductive surface 24 and a bottom platen 30 consisting of a cover 32, a micro-machined base and a conductive surface 34 with an insulating layer 35 thereover facing the conductive surface 24 of the cover 20. A micro-machined movable member 40 (which may be a proof mass) covered by underlying and overlying conductive layers 42 is supported on an elastically deformable micro-machined spring structure 50. The spring structure is fixedly connected, in turn, to the cover and base 20, 30. The thin insulating layer 35 prevents shorting during caging. The underlying conductive layer 42 on the member 40 ensures close proximity and high force between the platens during caging.

A feedback position controller circuit 60 controls the voltage applied to the top cover conductive surface 24 so as to hold the movable member 40 at a selected equilibrium height between the top and bottom platens 20, 30. The feedback position controller circuit 60 senses (for example) changes in capacitance between the conductive surfaces 24, 42 of the top platen 20 and movable member 40 to determine displacement of the movable member from its equilibrium height. It then changes the voltage $V_{control}$ applied to the cover conductive surface 24 so as to exert a compensating force tending to return the movable member 40 to its equilibrium height.

In order that the feedback position controller circuit 60 be able to measure the required capacitance changes, the top platen conductive surface 24 and the movable member conductive surface 42 are both connected to the inputs of the position controller circuit 60.

The desired force described previously in connection with caging, calibration, characterization and compensation is produced by a voltage $V_{applied}$ applied to the base conductive surface 34 underlying the movable member 40. This voltage is controlled by a microprocessor 70 through a digital-to-analog (D/A) converter 80. The output of the feedback position controller 60 may be applied to an input to the control microprocessor 70 for calibration purposes, if desired. The output of the feedback position controller 60 is proportional to the applied force of the transducer and is monitored to determine the several acceleration parameters.

Caging Embodiment

In this embodiment, the microprocessor 70 is not necessarily required. Instead, a back-up battery 100 mounted on (or linked to) the bottom platen 30 is connected directly to the bottom platen conductive surface 34 whenever the device is being shipped, handled or stored. The battery voltage is sufficient to hold the movable member against the bottom platen 30 under a large range of accelerations.

Calibration and Characterization Embodiments

In this embodiment, the microprocessor 70 is programmed to compare the response of the feedback position controller 60 with previously recorded responses to predetermined voltages applied through the D/A converter to the lower platen conductive surface 34. The values of the predetermined voltages may be stored in a memory 110 for retrieval by the microprocessor 70. Moreover, the previously recorded responses of the feedback position controller 60 to each of the predetermined voltages may also be stored in the memory 110. These may be used by the microprocessor 70 in computing a new conversion factor between the voltage $V_{control}$ applied by the feedback position controller 60 and the magnitude of the measured force.

To illustrate this concept, FIG. 2 is a simulated graph of data obtained when known static accelerations are applied to an accelerometer implemented in accordance with FIG. 1. These data are stored in the memory 110. The ordinate of the graph of FIG. 2 is the output voltage $V_{control}$ of the feedback position controller 60 while the abscissa is the applied acceleration. FIG. 3 is a graph of data obtained by increasing the voltage $V_{control}$ while no actual acceleration is applied to the transducer. The microprocessor 70 (or any computer) is readily programmed to correlate each value of the stimulus voltage $V_{applied}$ to an equivalent acceleration value from the data of FIGS. 2 and 3. This correlation may be stored in the memory 110 for use in re-calibrating the device at remote sites by simply applying a selected value of $V_{applied}$ to the lower platen conductive surface 34 while observing the feedback position control output voltage $V_{control}$.

In another example of such an embodiment, a control device (such as the microprocessor 70) causes a dynamic test stimulus signal to be applied to the $V_{applied}$ input while the feedback control output $V_{control}$ is observed. For example, the test stimulus signal may be a sine wave voltage but may also be a random noise voltage or a static voltage. By simultaneously calibrating several transducers with the same random noise, transfer functions and coherence functions can be employed to simultaneously calibrate amplitude and phase and to measure the quality of the calibrations. By discretely or continuously varying the frequency of the sine wave voltage across a range while recording the position control voltage $V_{control}$, the frequency response of the transducer of FIG. 1 may be characterized at any time. If the microprocessor 70 and D/A converter 80 are employed for this purpose, then the transducer response may be characterized quickly at any location and at any time during use. of course, any parameters other than or in addition to frequency response may be characterized in accordance with this aspect of the invention.

Static and Dynamic Compensation Embodiment

In this embodiment, the control microprocessor 70 is programmed to generate a stimulus signal $V_{applied}$ through the D/A converter 80 in response to signals received from sources of external excitations. For example, if the transducer of FIG. 1 is a pressure transducer, it may be desired to back out a very high static pressure measured by the transducer so that only pressure deviations from the high static pressure are measured. This feature separates a large static ambient signal from a desired small dynamic signal. In this case, the external stimulus received by the microprocessor 70 may be the output of a pressure sensor.

In another example, the transducer of FIG. 1 may be one of three identical accelerometers integrated into an inertial measurement system and lying along three respective orthogonal axes, to within a manufacturing alignment error. The alignment error causes small components of accelerations experienced along one axis exclusively to be sensed by accelerometers lying along the other axes. Using the characterization embodiment of the invention, the effects of these errors are readily quantified. From this, compensation signals may be computed from the output of any two accelerometers to be applied to the $V_{applied}$ input of the remaining accelerometer to null out effects of the misalignment error.

While the invention has been described in detail with reference to an electrostatically controlled movable member, the invention may also be implemented by magnetically controlling the movable member. Moreover, while the invention has been described in detail with reference to an embodiment in which the displacement of the movable member is sensed capacitively, other displacement sensing methods may be employed. For example, the displacement may be monitored and measured using purely optical techniques. Alternatively, displacement can be measured using electron-tunneling tip technology, for example.

While the invention has been described in detail by specific reference to preferred embodiments, variations and modifications thereof may be made without departing from the true spirit and scope of the invention.

What is claimed is:

1. A microstructural transducer, comprising:
    a microstructural platform;
    a movable microstructural member coupled to said platform and having a conductive film thereon;
    a first stationary electrode having an overlying insulating thin film thereon facing said conductive film of said movable microstructural member; and
    caging voltage supply means for applying a caging voltage across said first stationary electrode and said conductive film of said movable microstructural member.

2. The transducer of claim 1 wherein said caging potential is sufficient to draw said movable microstructural member toward said stationary electrode until said microstructural member abuts said insulating thin film of said stationary electrode.

3. The transducer of claim 2 further comprising switching means for disconnecting said caging voltage supply means so as to release said movable microstructural member from said stationary electrode.

4. The transducer of claim 1 wherein said movable microstructural member is elastically coupled to said microstructural platform.

5. The transducer of claim 1 further comprising measuring means for sensing displacement of said movable microstructural member relative to said microstructural platform.

6. The transducer of claim 5 further comprising means for applying a force field near said movable microstructural member corresponding to a predetermined stimulus.

7. The transducer of claim 6 wherein said means for applying a force field comprises a controllable voltage source connectable to said first stationary electrode.

8. The transducer of claim 7 wherein said predetermined stimulus corresponds to a selected force magnitude for calibrating said transducer.

9. The transducer of claim 8 wherein said movable microstructural member comprises a proof mass and wherein said selected force magnitude corresponds to an acceleration.

10. The transducer of claim 7 wherein said predetermined stimulus corresponds to a test stimulus signal capable of producing displacements of the movable microstructural member, said displacements being sensed by the measuring means and employed to characterize a parameter of the transducer.

11. The transducer of claim 10 wherein said parameter to be characterized is frequency response of said transducer.

12. The transducer of claim 11 wherein said test stimulus signal is a time-varying signal of a selected frequency.

13. The transducer of claim 5 wherein said measuring means comprises capacitive sensing means for sensing movement of said movable microstructural member.

14. The transducer of claim 5 wherein said measuring means comprises means for applying near said movable microstructural member an equilibrating force field sufficient to return said movable microstructural member to an initial equilibrium position in response to movement of said movable microstructural member.

15. The transducer of claim 14 wherein said force field comprises an electric field.

16. The transducer of claim 15 wherein said means for applying said equilibrating force field comprises a second stationary electrode facing said movable microstructural member.

17. The transducer of claim 16 wherein said second stationary electrode is on an opposite side of said movable member from said first stationary electrode.

* * * * *

UNITED STATES PATENT AND TRADEMARK OFFICE
CERTIFICATE OF CORRECTION

PATENT NO : 6,109,114
DATED : August 29, 2000
INVENTOR(S): Frank T. Hartley and James H. Wise It is certified that error appears in the above-identified patent and that said Letters Patent is hereby corrected as shown below:

In Column 1, lines 10-12, please replace the Origin of Invention with the following:

--The invention described herein was made in the performance of work under a NASA contract, and is subject to the provisions of Public Law 96-517 (35 U.S.C. §202) in which the Contractor has elected to retain title.--

Signed and Sealed this

Twenty-second Day of May, 2001

*Attest:*

NICHOLAS P. GODICI

*Attesting Officer*   Acting Director of the United States Patent and Trademark Office